United States Patent
Lee

(10) Patent No.: US 8,499,319 B2
(45) Date of Patent: Jul. 30, 2013

(54) APPARATUS AND METHOD FOR PROCESSING IMAGE

(75) Inventor: Tae-hyung Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 427 days.

(21) Appl. No.: 12/535,365

(22) Filed: Aug. 4, 2009

(65) Prior Publication Data

US 2010/0122291 A1 May 13, 2010

(30) Foreign Application Priority Data

Nov. 11, 2008 (KR) .................. 10-2008-0111789

(51) Int. Cl.
*G06F 3/00* (2006.01)
*H04N 5/50* (2006.01)
*H04N 5/44* (2011.01)
*H04N 7/16* (2011.01)

(52) U.S. Cl.
USPC ............... 725/37; 348/731; 348/734; 725/46; 725/139

(58) Field of Classification Search
None
See application file for complete search history.

(56) References Cited

U.S. PATENT DOCUMENTS

| | | | |
|---|---|---|---|
| 5,317,403 A * | 5/1994 | Keenan ........................... | 725/38 |
| 5,801,747 A * | 9/1998 | Bedard ........................... | 725/46 |
| 6,182,287 B1 * | 1/2001 | Schneidewend et al. ....... | 725/48 |
| 2002/0122079 A1 * | 9/2002 | Kamen et al. .................. | 345/863 |
| 2006/0181429 A1 * | 8/2006 | Garrison .................. | 340/825.69 |
| 2007/0212025 A1 * | 9/2007 | Barton et al. .................... | 386/94 |

FOREIGN PATENT DOCUMENTS

| | | |
|---|---|---|
| KR | 1020000003550 A | 1/2000 |
| KR | 1020000051458 A | 8/2000 |
| KR | 1020050120419 A | 12/2005 |
| KR | 1020060030739 A | 4/2006 |
| KR | 1020060131270 A | 12/2006 |
| KR | 1020070028028 A | 3/2007 |

* cited by examiner

*Primary Examiner* — Chris Parry
*Assistant Examiner* — James R Marandi
(74) *Attorney, Agent, or Firm* — Sughrue Mion, PLLC

(57) ABSTRACT

Disclosed is an image processing apparatus including: an image processing unit which processes and displays a broadcasting signal; a user input unit through which a user inputs a key selection signal; and a controller which performs a switch to a favorite channel or performs a certain function in association with the favorite channel if an input time of the key selection signal is equal to or longer than a predetermined time. With this, a viewer can more directly and conveniently search favorite channels.

20 Claims, 8 Drawing Sheets

FIG. 2

| CH | CHANNEL NAME | CH | CHANNEL NAME |
|---|---|---|---|
| 2 | KTV | 43 | MBN |
| 3 | NBC(National Broadcasting Corperation) | 44 | ITVS |
| 4 | LOCAL BROADCAST/EPG | 45 | ANIMATION |
| 5 | SBS | 46 | MBC game |
| 6 | ABC(American Broadcasting Corperation) | 47(FAVORITE CHANNEL) | MBC game PBS(Public Broadcasting Systems) |
| 7(FAVORITE CHANNEL) | CBS(Columbia Broadcasting Corperation) | 49(FAVORITE CHANNEL) | TCM |
| 8 | KBS2 | 50 | KBS sports |
| 9 | CNN | 51 | SBS sports |
| 10 | KBS1 | 52 | Q CHANNEL |
| 11 | HISTORY | 53 | FTV |
| 12 | MBC | 54(FAVORITE CHANNEL) | FXnetworks |
| 13 | EBS | 55 | ECONOMY |
| 14 | FOX | 56 | ASIA |
| 15 | MIN | 57(FAVORITE CHANNEL) | Scenery of EUROPE |
| 16(FAVORITE CHANNEL) | WB(Wanner Brother) | 58 | NATURE |
| 17 | OCN | 59 | HBO |
| 18 | Cartoon network | 60 | Olive |
| 19 | SporitingNEWS | 61 | KM |
| 20 | CGV | 62 | DOCUMENTARY CHANNEL |
| 21 | CNN studentnews | 63 | GOLF |
| 22 | TOONIVERSE | 64 | SBS golf |
| 23 | CHINESE TV | 66 | LIVING TV |
| 24 | YTN | 67 | XTM |
| 25 | DISCOVERY | 68 | MOVIE AND STAR |
| 26 | real TV | 69 | VISION |
| 27 | m.net | 70 | NEW CHANNEL 13 |
| 28 | MTV | 71 | SHOPPING |
| 29 | Air America | 72 | CAR RACING |
| 30 | MBC MOVIE | 73 | AFKN |
| 33 | ABO | 74 | NHK |
| 34 | Sports | 75 | HUMAN TV |
| 35 | MBC espn | 76 | CHANNEL J |
| 36 | CBS | 77 | BILLBOARD CHART |
| 37 | Music | 78 | CHRISTIAN TV |
| 38 | WORLD'S VISION | 6-1 | SBS DIGITAL |
| 39 | GAME | 7-1 | KBS2 DIGITAL |
| 40 | MGM | 9-1 | KBS1 DIGITAL |
| 41 | EBS PLUS1 | 10-1 | EBS DIGITAL |
| 42 | EBS PLUS2 | 11-1 | MBC DIGITAL |

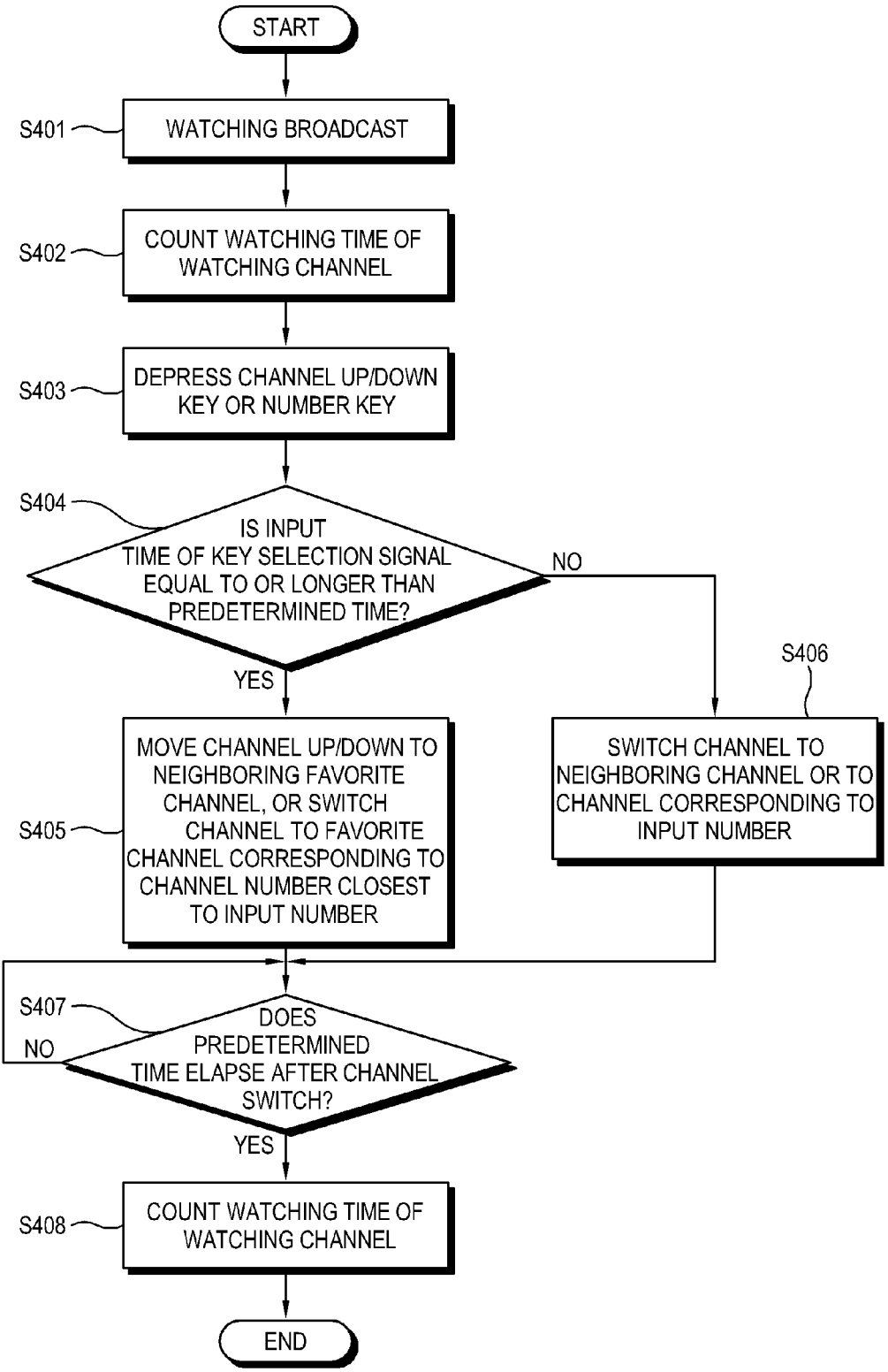

APPARATUS AND METHOD FOR PROCESSING IMAGE

CROSS-REFERENCE TO RELATED APPLICATION

This application claims priority from Korean Patent Application No. 10-2008-0111789, filed on Nov. 11, 2008, in the Korean Intellectual Property Office, the disclosure of which is incorporated herein by reference.

BACKGROUND OF INVENTION

1. Field of Invention

Apparatuses and methods consistent with exemplary embodiments of the present invention relate to processing an image, and more particularly, to an apparatus and method for processing an image, in which a user can more directly and conveniently search favorite channels, using an existing remote controller or a key provided in the image processing apparatus.

2. Description of the Related Art

As a broadcast receiving system gets digitalized, the number of channels provided to a viewer has increased rapidly. Accordingly, it takes much time for a viewer to search a channel he/she wants to watch among many channels.

To solve this problem, there have been conventionally proposed methods of storing a viewer's favorite channels and allowing them to be searched if necessary. However, to search the favorite channels stored by the conventional methods, a viewer has to input a separate key through a remote controller or to search the favorite channels set in a menu via many steps. Also, it is difficult for a viewer unfamiliar with the menu operating to search the favorite channels.

SUMMARY OF THE INVENTION

Accordingly, an aspect of the present invention is to provide a method of allowing a user to more directly and conveniently search a favorite channel.

The foregoing and/or other aspects of the present invention can be achieved by providing an image processing apparatus including: an image processing unit which processes and displays a broadcasting signal; a user input unit through which a user inputs a key selection signal; and a controller which performs a switch to a favorite channel or performs a certain function in association with the favorite channel if an input time of the key selection signal is equal to or longer than a predetermined time.

In the foregoing image processing apparatus, the controller may move a channel up/down to a neighboring favorite channel if the key selection signal corresponds to a channel up/down key. The controller may switch a channel to a favorite channel corresponding to a channel number closest to an input number if the key selection signal corresponds to a number key. The controller may perform a certain function in association with a favorite channel if the key selection signal corresponds to the certain function. The input time of the key selection signal may include an input time of a button or a contact time of a touch panel. The controller may set up the favorite channel on the basis of a user's selection or an accumulated watching time according to channels obtained by summing a watching time of each channel. The controller may sum the watching time when a predetermined time elapses after switching to a certain channel. The image processing apparatus may further include a storage unit which stores the accumulated watching time according to channels. The controller may sum the number of watching times according to channels and sets up the favorite channels on the basis of the total number of watching times.

Another aspect of the present invention can be achieved by providing an image processing method including: receiving a key selection signal input by a user; performing a switch to a favorite channel or performing a certain function in association with the favorite channel if an input time of the key selection signal is equal to or longer than a predetermined time; and processing and displaying the certain function or a broadcasting signal of the favorite channel.

In the foregoing image processing method, a channel may be moved up/down to a neighboring favorite channel if the key selection signal corresponds to a channel up/down key. A channel may be switched to a favorite channel corresponding to a channel number closest to an input number if the key selection signal corresponds to a number key. A certain function may be performed in association with a favorite channel if the key selection signal corresponds to the certain function. The input time of the key selection signal may include an input time of a button or a contact time of a touch panel. The favorite channel may be set up on the basis of a user's selection or an accumulated watching time according to channels obtained by summing a watching time of each channel. The watching time may be summed when a predetermined time elapses after switching to a certain channel. The image processing method may further include storing the accumulated watching time according to channels. The number of watching times may be summed according to channels and the favorite channels are set up on the basis of the total number of watching times. The predetermined time may be set up by a user through a setting menu.

BRIEF DESCRIPTION OF THE DRAWINGS

The above and/or other aspects of the present invention will become apparent and more readily appreciated from the following description of the exemplary embodiments, taken in conjunction with the accompanying drawings, in which:

FIG. 2 is a table of exemplary cable broadcasting channels;

FIG. 4 is a flowchart of processing an image according to the first exemplary embodiment of the present invention.

DETAILED DESCRIPTION OF EXEMPLARY EMBODIMENTS OF THE INVENTION

Figure 1:
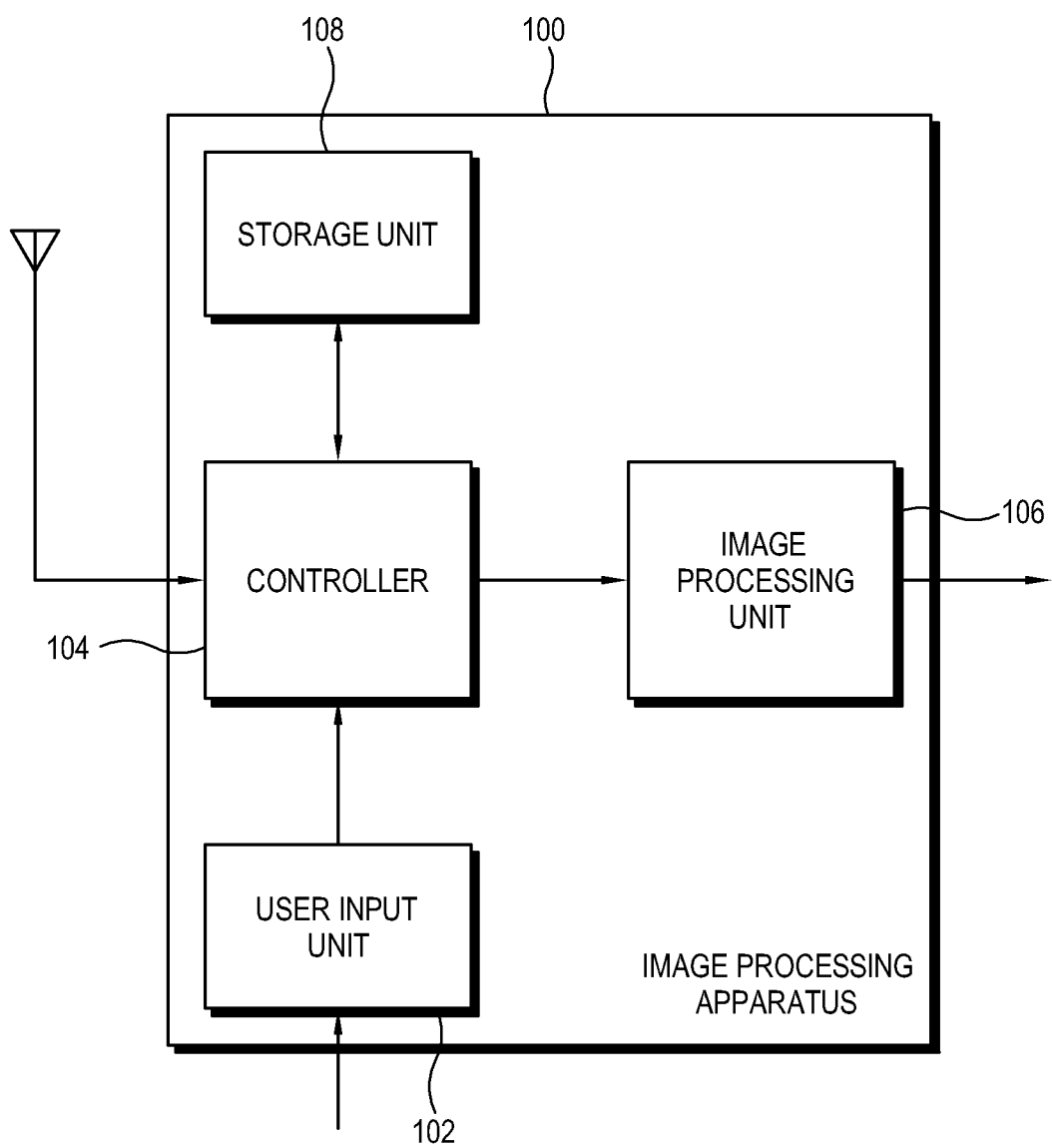
FIG. 1 is a block diagram of an image processing apparatus according to an exemplary embodiment of the present invention.

Below, exemplary embodiments of the present invention will be described in detail with reference to accompanying drawings so as to be easily realized by a person having ordinary knowledge in the art. The present invention may be embodied in various forms without being limited to the exemplary embodiments set forth herein. Descriptions about irrelative parts are omitted for clarity, and like reference numerals refer to like elements throughout.

FIG. 1 is a block diagram of an image processing apparatus according to an exemplary embodiment of the present invention.

According to an exemplary embodiment of the present invention, an image processing apparatus 100 includes a digital television (TV), an analog TV, a set-top box (STB), a desktop computer, a notebook computer, a mobile terminal, a personal digital assistant, etc. Further, the image processing apparatus 100 may include any electronic device as long as it can generate a key selection signal based on an input of a user and perform a function in response to the key selection signal.

The image processing apparatus 100 may include a user input unit 102, a controller 104, an image processing unit 106, and a storage unit 108. The user input unit 102 receives user input so a key selection signal is generated.

The key selection signal may be generated in response to a user depressing a button or by contacting a touch sensitive panel. To this end, a key may be provided in the form of a button or a touch panel. In this case, a user pushes, touches or depresses a key provided in a remote controller or the image processing apparatus 100. Meanwhile, an input time of the key selection signal may be an input time of the button or a contact time of the touch panel. In an exemplary embodiment, the input time of the button is the length of time a button is depressed and the contact time is the length of time a contact is made with the touch panel. The following exemplary embodiments of the invention are not limited to mere depressing of a button. Other methods of input such as contacting or touching a touch sensitive screen or others methods of input are interchangeable with the depressing of a button described below.

If the input time of the key selection signal is equal to or longer than a predetermined time, the controller 104 may perform a switch to a favorite channel or a certain function in association with the favorite channel. Here, the predetermined time may be set up in consideration of the key selection signal's input time generally taken by a user.

According to a first exemplary embodiment of the present invention, the controller 104 may perform the switch to the favorite channel when the input time of the key selection signal is equal to or longer than a predetermined time.

Specifically, if the key selection signal corresponds to a channel up/down key, i.e., a channel change key, the controller 104 may correspondingly move a channel up or down to a neighboring favorite channel. In an exemplary embodiment, the channel up/down key may be one of a channel up key or a channel down key. In another exemplary embodiment, the channel up/down key may be a single key with a channel up portion and a channel down portion. That is, when a user depresses a channel up key for a time equal to or longer than a predetermined time, the controller 104 moves the channel up to the next favorite channel. On the other hand, when a user depresses a channel down key for a time equal to or longer than a predetermined time, the controller 104 moves the channel down to the next favorite channel. In an exemplary embodiment, the channel up/down key is a single toggle style key to change the channel up or down. In another exemplary embodiment, the channel up/down key are two separate keys, i.e., a channel up key and a channel down key.

Also, if the key selection signal corresponds to a number key, the controller 104 may switch a channel to a favorite channel corresponding to a channel number closest to an input number. For example, when a user depresses a number key of "7" for a time equal to or longer than a predetermined time, the controller 104 may switch the channel to the favorite channel closest to a channel number of "7."

According to a second exemplary embodiment of the present invention, the controller 104 may perform a certain function in association with the favorite channel when the input time of the key selection signal is equal to or longer than a predetermined time. Specifically, if the key selection signal corresponds to a certain function, the controller 104 may perform the certain function in association with the favorite channel. For example, if a user depresses an electronic program guide (EPG) key for a time equal to or longer than a predetermined time, the controller 104 may output an EPG relevant to the favorite channel.

The keys for the certain functions may include the EPG key, a previous channel key, a menu key, etc. Hereinafter, all keys except the channel up/down keys and the number keys will be defined as keys for the certain functions.

Meanwhile, the controller 104 may set the favorite channel on the basis of a user's selection or an accumulated watching time according to channels obtained by summing a watching time of each channel.

In the case that the favorite channel is set on the basis of the accumulated watching time according to the channels, the controller 104 may sum the watching time when a predetermined time elapses after switching to a certain channel. In this case, only the actual watching time not including the time taken in searching a channel is summed to thereby set the favorite channels more reliably.

Alternatively, the controller 104 may sum the number of watching times according to channels and set the favorite channels on the basis of the total number of watching times.

The image processing unit 106 processes a broadcasting signal to be displayed. In more detail, the image processing unit 106 adjusts the brightness or resolution of an output image, or scales the output image to a screen. In this case, the image processing unit 106 may include a liquid crystal display (LCD), an organic light emitting display (OLED), a plasma display panel (PDP), etc.

The storage unit 108 may store the accumulated watching time according to channels. Besides, the storage unit 108 may store the number of watching times according to channels, the favorite channels, etc. Here, the favorite channels may be set as a top predetermined number of channels whose accumulated watching time is long, or may be manually set by a viewer.

FIG. 2 is a table of exemplary cable broadcasting channels.

Referring to FIG. 2, a cable channel is set corresponding to each channel number. For example, a channel number of "7" is a Columbia Broadcasting Cooperation (CBS) channel, and a channel number of "11" is a History channel. If a user selects a certain channel number, the image processing apparatus 100 is tuned to a frequency of a cable channel corresponding to the selected channel number and receives a broadcasting signal from the cable channel.

In this embodiment, the channel numbers of "7 (CBS)," "16 (WB)," "47 (PBS)," "49 (TCM)," "54 (FXnetworks)" and "57 (Scenery of EUROPE)" are set as the favorite channels.

Below, an image processing method according to an exemplary embodiment of the present invention will be described in more detail, taking example by the foregoing table of the cable broadcasting channels.

Figure 3A:
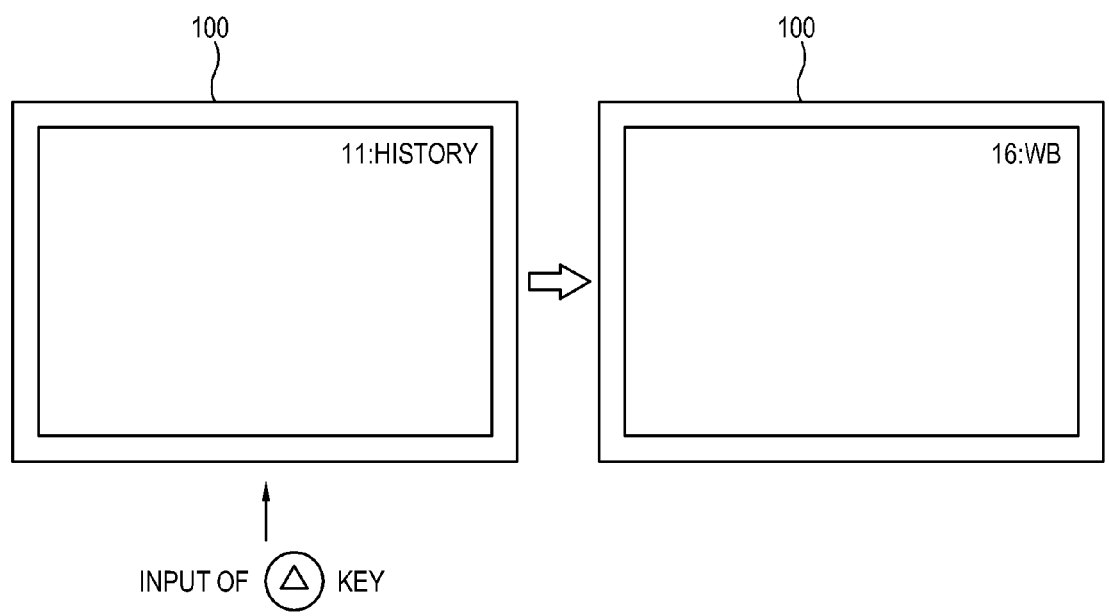
FIGS. 3A and 3B illustrate examples of channels switched according to a first exemplary embodiment of the present invention.
Figure 3B:
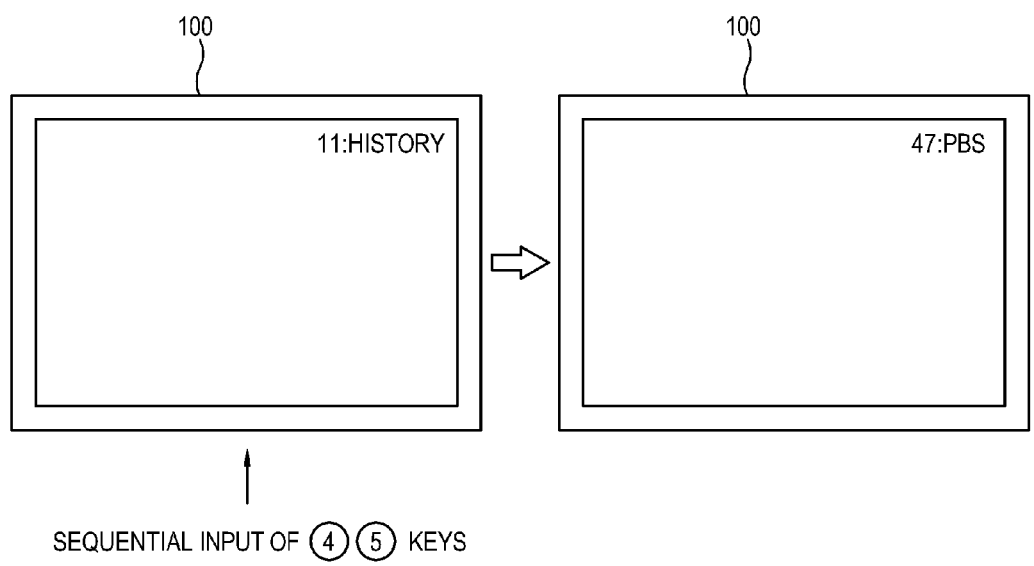

FIGS. 3A and 3B illustrate examples of channels switched according to the first exemplary embodiment of the present invention, respectively.

In the first exemplary embodiment, the image processing apparatus 100 may perform the switch to the favorite channel if the input time of the key selection signal is equal to or longer than a predetermined time. Here, if the key selection signal corresponds to the channel up/down key, the image processing apparatus 100 may move a channel up/down to a neighboring favorite channel. Also, if the key selection signal corresponds to the number key, the image processing apparatus 100 may switch a channel to a favorite channel corresponding to a channel number closest to an input number.

Referring to FIG. 3A, a user is now watching a channel corresponding to a channel number of "11 (HISTORY)." If a user depresses the channel up key for a time equal to or longer than a predetermined time, the image processing apparatus 100 moves the channel up to the next favorite channel corresponding to the channel number of "16 (WB)." On the other hand, when a user depresses the channel down key for a time equal to or longer than a predetermined time, the image processing apparatus 100 moves the channel down to the next favorite channel corresponding to the channel number of "7 (CBS)."

A user may not remember a favorite channel number correctly. In other words, a user may remember a favorite channel number roughly. For example, a user may remember not the correct favorite-channel number he/she wants to watch but that the favorite channel number exists around "45." According to an exemplary embodiment of the present invention, if a user depresses one number key for a predetermined length of time, a current channel is switched to a favorite channel closest to the input single-digit number. Likewise, if a user depresses two number keys in sequence for a predetermined length of time, the current channel is switched to a favorite channel closest to the input double-digit number.

Referring to FIG. 3B, a user is now watching a channel corresponding to the channel number of "11 (HISTORY)." At this time, if a user depresses the number keys of "4" and "5" in sequence for a time equal to or longer than a predetermined time, the image processing apparatus 100 switches the current channel to the favorite channel corresponding to the channel number of "47" closest to the number of "45." Likewise, if a user depresses the number key of "6" for a time equal to or longer than a predetermined time, the image processing apparatus 100 switches the current channel to the favorite channel corresponding to the channel number of "7" closest to the number of "6."

Thus, as shown in FIG. 3B, it is possible for a user to directly switch a current channel to the favorite channel he/she wants to watch, without going through many steps of searching a channel list.

Figure 3C:
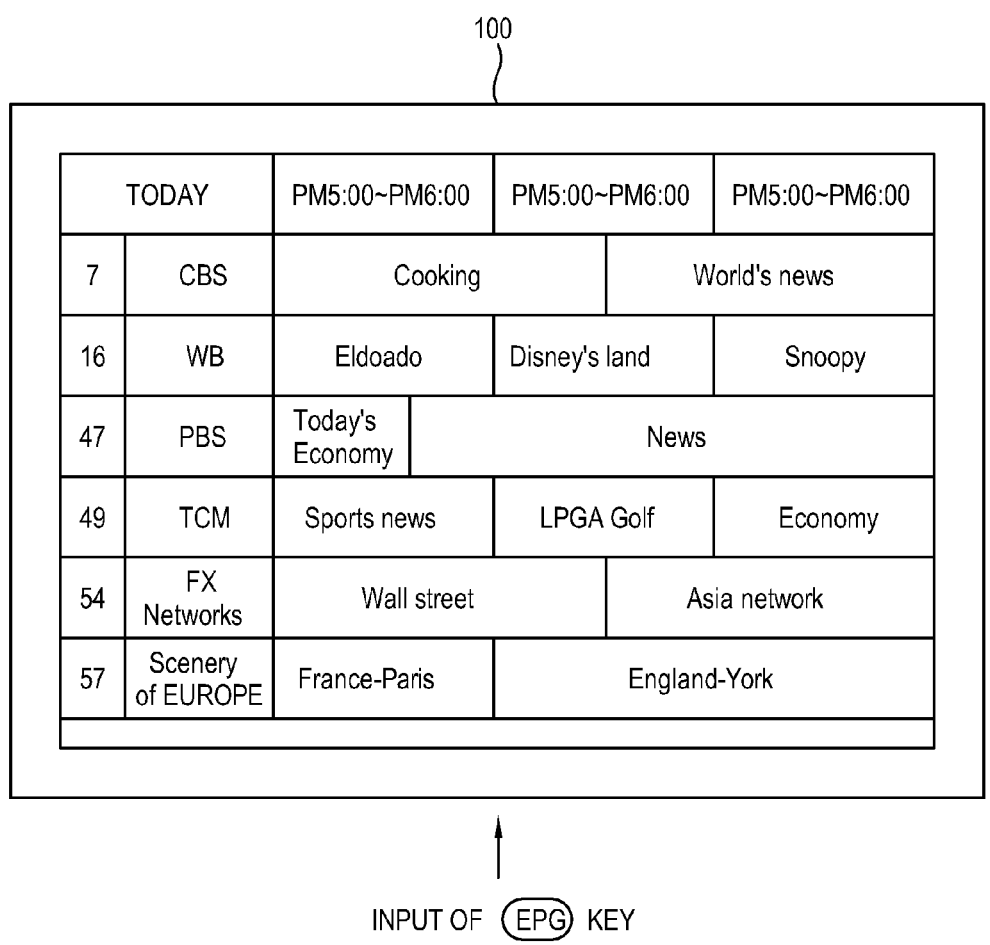
FIGS. 3C and 3D illustrate examples of certain functions performed according to a second exemplary embodiment of the present invention.
Figure 3D:
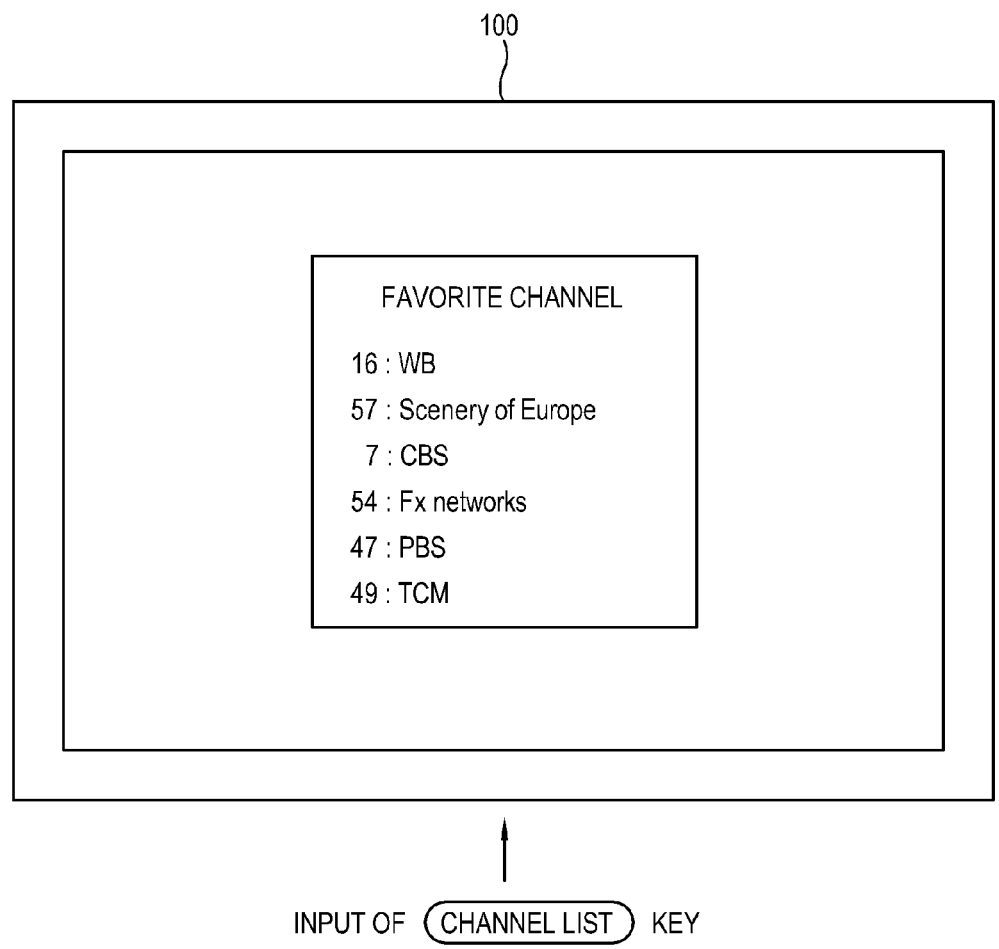

FIGS. 3C and 3D illustrate examples of certain functions performed according to a second exemplary embodiment of the present invention, respectively.

In the second exemplary embodiment, the image processing apparatus 100 may perform a certain function in association with the favorite channel if the input time of the key selection signal is equal to or longer than a predetermined time. Specifically, if the key selection signal corresponds to a certain function, the image processing apparatus 100 may perform the certain function in association with the favorite channel.

Referring to FIG. 3C, if a user depresses the EPG key for a time equal to or longer than a predetermined time, the image processing apparatus 100 may output EPG information relevant to the favorite channels, i.e., the channel numbers of "7 (CBS)," "16 (WB)," "47 (PBS)," "49 (TCM)," "54 (FXnetworks)" and "57 (Scenery of EUROPE)." On the other hand, if a user depresses the EPG key for a general input time, i.e., for a time less than the predetermined time, the image processing apparatus 100 may output the EPG information relevant to all the cable broadcasting channels. Referring to FIG. 2, there exist seventy-eight channels, and thus the EPG information will be output to the screen with respect to seventy-eight channels.

Referring to FIG. 3D, if a user depresses a channel list key for a time equal to or longer than a predetermined time, the image processing apparatus 100 outputs only a list of the favorite channels. Specifically, only the channel number and channel name of the favorite channel are output, and the favorite channels are arranged in the order of priority. By way of example, in FIG. 3D, the favorite channels are listed in order of the channel numbers of "16 (WB)," "57 (Scenery of EUROPE)," "7 (CS)," "54 (FXnetworks)," "47 (PBS)" and "49 (TCM)." On the other hand, if a user depresses the channel list key for a general input time, the image processing apparatus 100 may output a list of all the cable broadcasting channels. Referring to FIG. 2, there exist seventy-eight channels, and thus the channel numbers and names will be output with respect to seventy-eight channels.

In addition, like operations may be also performed with respect to other keys such as the menu key, the previous channel key, etc. For example, if a user depresses the menu key for a time equal to or longer than a predetermined time, the image processing apparatus 100 may output only favorite menus. Further, if a user depresses the previous channel key for a time equal to or longer than a predetermined time, the image processing apparatus 100 may perform the switch to the favorite channel among previous channels.

FIG. 4 is a flowchart of processing an image according to the first exemplary embodiment of the present invention.

At operation S401, a user turns on the image processing apparatus 100 and begins to watch a broadcast from a certain channel. At operation S402, the image processing apparatus 100 counts the watching time of the certain channel. Thus, the image processing apparatus 100 adds the counted watching time to the accumulated watching time previously stored according to channels and correspondingly updates information about the favorite channels.

At operation S403, a user depresses the channel up/down key or the number key. When the key selection signal is generated based on the user input, at operation S404 the image processing apparatus 100 determines whether the input time of the key selection signal is equal to or longer than a predetermined time. Here, the predetermined time may be set up in consideration of the key selection signal's input time generally taken by a user. To this end, a user may use a settings menu to set up the predetermined time.

In the case that the input time of the key selection signal is equal to or longer than the predetermined time, at operation S405 the image processing apparatus 100 may move a channel up/down to a neighboring favorite channel or switch the channel to a favorite channel corresponding to a channel number closest to an input number.

Specifically, if the key selection signal corresponds to the channel up/down key, the image processing apparatus 100 may move the channel up/down to a neighboring favorite channel. That is, when a user depresses the channel up key for a time equal to or longer than a predetermined time, the image processing apparatus 100 moves the channel up to the next favorite channel. On the other hand, when a user depresses the channel down key for a time equal to or longer than a predetermined time, the image processing apparatus 100 moves the channel down to the next favorite channel.

Also, if the key selection signal corresponds to a number key, the image processing apparatus 100 may switch a channel to a favorite channel corresponding to a channel number closest to the input number.

Meanwhile, there may be two favorite channels corresponding to the channel number closest to the input number. For example, there is an instance where a current channel number is "6" and channel numbers of "4" and "8" are set up as the favorite channels. In this case, the image processing apparatus 100 may simultaneously display two favorite channels in the form of picture-in-picture (PIP) or picture-by-picture (PBP), or may display one favorite channel selected according to the priority between the favorite channels.

In the operation S404, if the input time of the key selection signal is shorter than a predetermined time, at operation S406 the image processing apparatus 100 may perform a switch to the neighboring channel or to a channel of a channel number corresponding to the input number.

At operation S407, the image processing apparatus 100 determines whether a predetermined time elapses after the channel switch.

When it is determined that the predetermined time elapses, at operation S408 the image processing apparatus 100 counts the watching time of the switched watching channel. Thus, all the image processing operations according to the first exemplary embodiment of the present invention are completed.

Figure 5:
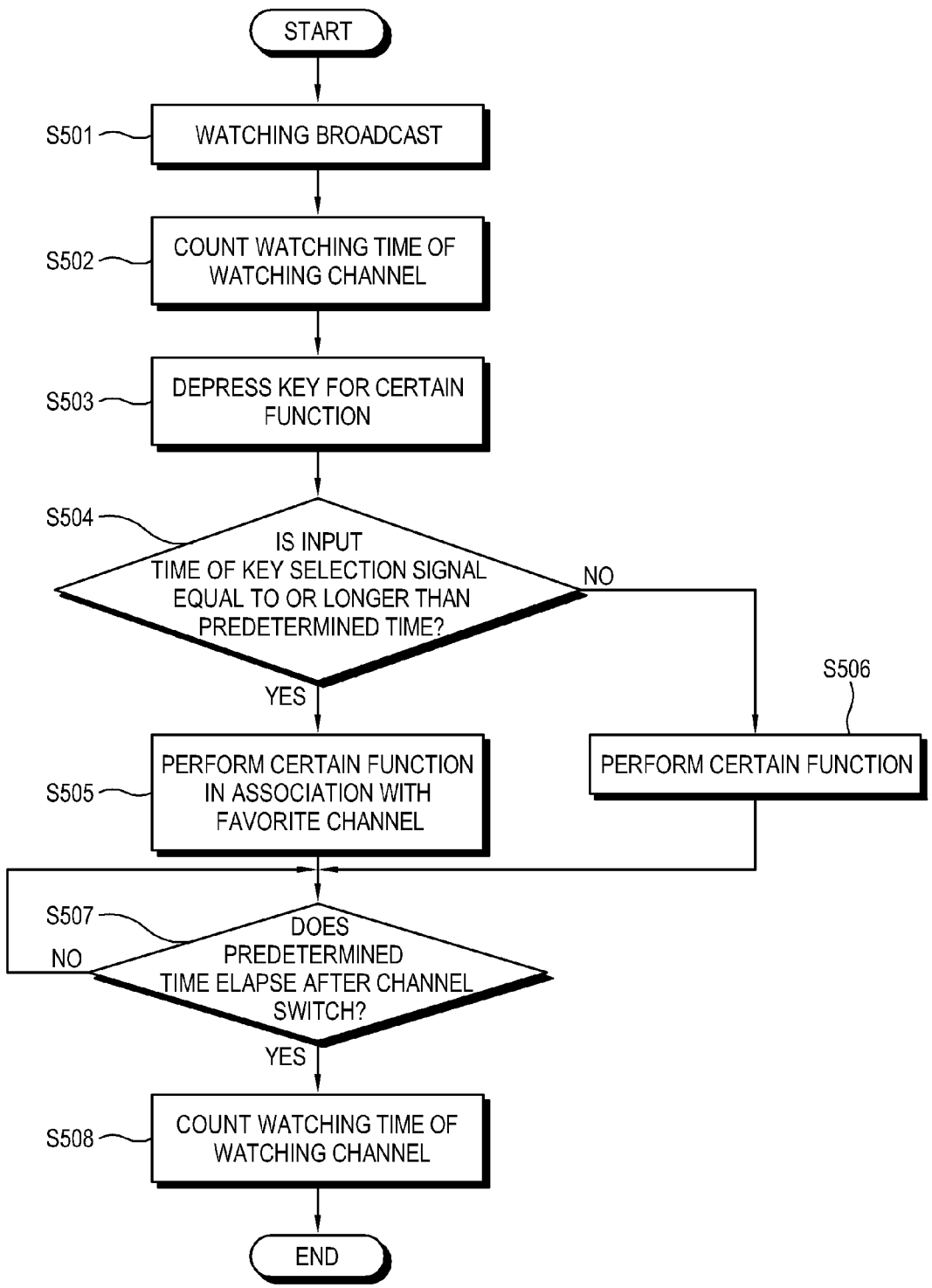
FIG. 5 is a flowchart of processing an image according to the second exemplary embodiment of the present invention.

FIG. 5 is a flowchart of processing an image according to the second exemplary embodiment of the present invention.

At operation S501, a user turns on the image processing apparatus 100 and begins to watch a broadcast from a certain channel. At operation S502, the image processing apparatus 100 counts the watching time of the certain channel.

At operation S503, a user depresses a key for a certain function. Here, the key for the certain function includes all keys except the channel up/down keys and the number keys. For example, the keys for the certain functions may include the EPG key, the previous channel key, the menu key, etc.

When the key selection signal is received from a user, at operation S504 the image processing apparatus 100 determines whether the input time of the key selection signal is equal to or longer than a predetermined time.

In the case that the input time of the key selection signal is equal to or longer than the predetermined time, at operation S505 the image processing apparatus 100 may perform the certain function in association with the favorite channel. Specifically, if the key selection signal corresponds to the certain function, the image processing apparatus 100 may perform the certain function in association with the favorite channel. For example, if a user depresses the EPG key for a time equal to or longer than a predetermined time, the image processing apparatus 100 may output an EPG relevant to only the favorite channels. Further, if a user depresses the menu key for a time equal to or longer than a predetermined time, the image processing apparatus 100 may output only favorite menus. Likewise, if a user depresses the previous channel key for a time equal to or longer than a predetermined time, the image processing apparatus 100 may perform a switch to the favorite channel among previous channels.

In the operation S504, if the input time of the key selection signal is shorter than a predetermined time, at operation S506 the image processing apparatus 100 may perform a certain function in association with a selected key.

At operation S507, the image processing apparatus 100 determines whether a predetermined time elapses after the channel switch.

When it is determined that the predetermined time elapses, at operation S508 the image processing apparatus 100 counts the watching time of the switched watching channel. Thus, all the image processing operations according to the second exemplary embodiment of the present invention are completed.

As described above, according to an exemplary embodiment of the present invention, a user can more directly and conveniently search favorite channels, using a key of an existing remote controller.

Although a few exemplary embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. An image processing apparatus comprising:
an image processing unit which processes and displays a broadcasting signal;
a user input unit which receives user input to generate a key selection signal; and
a controller which performs a channel-changing function that is performed based on a viewing channel in a viewing channel list, where the function corresponds to an input key which generates the key selection signal if an input maintaining time for generating the key selection signal is shorter than a predetermined time, and performs a channel-changing function corresponding to the input key to a favorite channel in a favorite channel list instead of the viewing channel list if the input maintaining time for generating the key selection signal is equal to or longer than the predetermined time,
wherein the input key is a channel change key to move a channel up or down.

2. The image processing apparatus according to claim 1, wherein the controller moves a channel up or the channel down to a neighboring favorite channel if the key selection signal corresponds to the channel change key and is equal to or longer than the predetermined time.

3. The image processing apparatus according to claim 1, wherein the controller performs the same function in association with the favorite channel if the key selection signal corresponds to the function and is equal to or longer than the predetermined time.

4. The image processing apparatus according to claim 1, wherein the input maintaining time for generating the key selection signal comprises an amount of time a button is depressed or an amount of time a contact is made on a touch sensitive panel.

5. The image processing apparatus according to claim 1, wherein the controller sets up the favorite channel based on a user's selection or accumulated watching times of channels, obtained by summing watching times of each of the channels.

6. The image processing apparatus according to claim 5, wherein the controller sums the watching times when a predetermined time elapses after switching to a certain channel.

7. The image processing apparatus according to claim 5, further comprising a storage unit which stores the accumulated watching times according to channels.

8. The image processing apparatus according to claim 1, wherein the controller sums amount of watching times according to channels and sets up the favorite channels based on a total amount of watching times.

9. An image processing method comprising:
receiving user input and generating a key selection signal based on the user input;
performing a channel-changing function that is performed based on a viewing channel in a viewing channel list where the function corresponds to an input key which generates the key selection signal if an input maintaining time for generating the key selection signal is shorter than a predetermined time, and performing a channel-changing function corresponding to the input key to a favorite channel in a favorite channel list instead of the viewing channel list if the input maintaining time for generating the key selection signal is equal to or longer than the predetermined time;

wherein the input key is a channel change key to move a channel up or down.

10. The image processing method according to claim 9, wherein a channel is moved up or down to a neighboring favorite channel if the key selection signal corresponds to the channel change key and is equal to or longer than the predetermined time.

11. The image processing method according to claim 9, wherein the same function is performed in association with the favorite channel if the key selection signal corresponds to the function and is equal to or longer than the predetermined time.

12. The image processing method according to claim 9, wherein the input maintaining time for generating the key selection signal comprises an amount of time a button is depressed or an amount of time a contact is made on a touch sensitive panel.

13. The image processing method according to claim 9, wherein the favorite channel is set up based on a user's selection or accumulated watching times of channels, obtained by summing watching times of each of the channels.

14. The image processing method according to claim 13, wherein the watching times are summed when a predetermined time elapses after switching to a certain channel.

15. The image processing method according to claim 13, further comprising storing the accumulated watching times according to channels.

16. The image processing method according to claim 13, wherein the amount of watching times are summed according to channels and the favorite channels based on a total amount of watching times.

17. The image processing method according to claim 9, wherein the predetermined time is set up by a user through a setting menu.

18. The image processing apparatus according to claim 1, wherein the controller sets up the input time of the key selection signal in consideration of input time of the key selection signal generally taken by a user.

19. The image processing apparatus according to claim 1, wherein the same function applies to the favorite channel list which includes the favorite channel as to the viewing channel list which includes the viewing channel if the input time of the key selection signal is equal to or longer than a predetermined time such that if a number key input by the user does not correspond to a channel in the favorite channel list, the controller selects a channel number from the favorite channel list that is closest to the input number.

20. The image processing apparatus according to claim 1, wherein the controller performs another function which corresponds to another input key for requesting a program guide such that if an input time for generating another key selection signal is shorter than a predetermined time, the program guide for the program list is provided and if the input time for generating said another key selection signal is equal to or greater than the predetermined time, the program guide for a favorite channel list is provided.

* * * * *